(12) United States Patent
Lacy

(10) Patent No.: US 6,486,468 B1
(45) Date of Patent: Nov. 26, 2002

(54) HIGH RESOLUTION, HIGH PRESSURE XENON GAMMA RAY SPECTROSCOPY USING PRIMARY AND STIMULATED LIGHT EMISSION

(75) Inventor: Jeffrey L. Lacy, Houston, TX (US)

(73) Assignee: Proportional Technologies, Inc., Houston, TX (US)

( * ) Notice: Subject to any disclaimer, the term of this patent is extended or adjusted under 35 U.S.C. 154(b) by 2 days.

(21) Appl. No.: 09/722,846

(22) Filed: Nov. 27, 2000

(51) Int. Cl.[7] ............................................. G01T 1/185
(52) U.S. Cl. .................. 250/282; 250/282; 250/361 R; 250/374; 250/382
(58) Field of Search ............................ 250/282, 361 R, 250/374, 382

(56) References Cited

U.S. PATENT DOCUMENTS 4,880,983 A * 11/1989 Markey .................... 250/385.1

OTHER PUBLICATIONS

Ulin et al. "Gamma–Spectrometer XENON for Space–gamma burts Study on Board ISS", SPIE vol. 3446, 76–80 (1998).*

* cited by examiner

Primary Examiner—Bruce Anderson
Assistant Examiner—Zia R. Hashmi
(74) Attorney, Agent, or Firm—Akin, Gump, Strauss, Hauer & Feld, L.L.P.

(57) ABSTRACT

A design and readout of a xenon detection medium based device, which provides improved spectroscopic performance compared to currently commercially available devices. To achieve energy resolution improvement, a method to accurately measure radial spatial position for interacting events within a HPXe cylindrical detector is described using the plan as shown in FIG. 4. This is accomplished by utilization of light generated both at the gamma interaction site and at the collection point near the anode wire of the cylindrical detector. These light flashes are detected by a VUV photon detector. Light transmission is facilitated by incorporating a vacuum ultraviolet (VUV) light transparent window at least one end of the cylindrical ionization detector. With the known electron drift velocity in HPXe, the time between these two photopulses is sufficient to accurately determine the radial coordinate. Consequently, correction by electronic means for the electrostatic pulse dispersion using the expression graphed in FIG. 2 can be achieved in order to approach the true intrinsic energy resolution limit for HPXe.

16 Claims, 4 Drawing Sheets

HIGH RESOLUTION, HIGH PRESSURE XENON GAMMA RAY SPECTROSCOPY USING PRIMARY AND STIMULATED LIGHT EMISSION

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

Devices for high-resolution gamma ray spectroscopy.

2. Description of the Related Art

Energy measurements of gamma rays in the energy range 100 keV to 10 MeV are of great use in many fields including; medical imaging, astrophysics, environmental monitoring and general nuclear spectroscopy.

High-pressure xenon (HPXe) has a potential to provide a medium with excellent spectroscopic characteristics. Excellent spectroscopic resolution of the xenon gas (0.6% full width half maximum (FWHM) energy resolution) is preserved up to a xenon gas density of 0.55 g/cm$^3$. Above this density, resolution degrades, eventually reaching the levels found in liquid xenon (LXe) at very high densities. Therefore, HPXe at 0.55 g/cm$^3$ is ideal because of its excellent energy resolution (0.6% FWHM at 662 keV and 0.4% FWHM at 1 MeV) and high stopping power (density 0.55 g/cm$^3$ and high Z of 54). The expected energy dependence of xenon resolution at 0.55 g/cm$^3$ is shown in FIG. 1. The characteristics of the leading media now in use, including liquid xenon, are contrasted with HPXe in Table 1.

TABLE 1

Properties of Detection Media for the 100 keV to 10 MeV Energy Range
Detection Medium

| | NaI | HPGe | CdTe/CdZn Te | LXe | HPXe |
|---|---|---|---|---|---|
| Energy Resolution | | | | | |
| at 662 keV | 6.0% | 0.2% | 1.2% | 7.3% | 0.6% |
| at 1.8 MeV | 3.6% | 0.1% | 0.9% | 4.4% | 0.33% |
| Stopping power | | | | | |
| Atomic Number (Z) | 11–53 | 32 | 48–52 | 54 | 54 |
| Density (g/cm$^3$) | 3.67 | 5.33 | 5.83–6.06 | 3.06 | 0.55 |
| Photoelectric/Compton cross-section at 1 MeV | 0.06 | 0.01 | 0.06 | 0.08 | 0.08 |

Because of the notable compressibility of xenon, a density of 0.55 g/cm$^3$ can be achieved at a reasonably modest pressure of about 55 atmospheres at room temperature (Bolotnikov A, Ramsey B. *Development of High-Pressure Xenon Detectors.* SPIE, 34446: 64–75, 1998). Other intrinsic characteristics of HPXe, including a photoelectric cross-section six times that of HPGe, make it an excellent detecting medium for gamma ray spectroscopy in the energy region of 50 keV to 10 MeV. Xenon gas itself is relatively cheap, and high levels of purity are easily achieved. Unlike other gamma ray spectroscopy detection media, notably HPGe, performance of HPXe is temperature insensitive, and a cryogenic cooling system is not required (Ulin S E, Dmitrenko A E, et. al. *Cylindrical High-Pressure Xenon Detector of Gamma Radiation. Instruments and Experimental Techniques,* 37(2) part 1: 142–45, 1994). Also, unlike some semiconductor detectors, HPXe does not undergo radiation damage (Vlasik K F, Grachev V M, et. al. *High-Pressure Xenon Gamma-Ray Spectrometers. Instruments and Experimental Techniques,* 42(5): 685–92, 1999).

Gamma ray detectors using HPXe have been designed in both parallel-plate and cylindrical configurations. In the parallel-plate HPXe ionization chamber, anode and cathode electrodes are separated by a volume of xenon detection medium and incoming gammas are recorded by their Compton and photoelectric interaction histories within this medium. Since the amplitude of the signal pulse caused by an ionizing interaction vertex in such a geometry is linearly dependent on the distance of the occurrence of such ionizing vertex from the anode plate, a shielding mesh must be placed parallel to and near the anode plate to facilitate precise energy resolution of such incident gammas. Incomplete shielding from the shielding grid, and the high capacitance of the parallel-plate geometry, and the nearby grid, significantly decreases the energy resolution of such an HPXe ionization chamber. While the intrinsic energy resolution of HPXe is 0.6% FWHM at 662 keV, the best parallel plate detectors have only achieved 2% FWHM resolution (Knoll G F. *Radiation and Detection and Measurement,* third edition. SPIE, 3446: 81–87, 1998). Furthermore, construction of a large HPXe parallel-plate ionization chamber is severely hampered by the bulk of the pressure vessel necessary to contain a large volume of the gas, which dictates a flat, not round, exterior surface. Additionally, the high electric field required to prevent electron-ion recombination in HPXe (2000–4000 V/cm) requires high voltage levels which are impractical for an electron drift distances over 10 to 15 cm. Finally, the mechanical instability of the shielding grid structure leads to serious microphonic noise sensitivity.

Cylindrical ionization chambers comprising a small cylindrical anode electrode surrounded by a concentric cathode electrode, are the geometry of choice for HPXe detectors (Tepper, supra, 1998) because they provide a much more efficient and safe containment of the required pressure and provide a simple and low cost construction free from fragility and microphonic sensitivity. However this seemingly simple cylindrical ionization chamber structure produces substantial geometric variation of the delivered signal. When a number N electrons are freed in the xenon gas by an ionizing interaction vertex, fewer than N electrons are actually sensed by the electronic means connected to the anode electrode because of electrostatic effects. The number of electrons delivered is only equal to N if the electrons are deposited very near the cathode electrode and these electrons then drift through the entire potential voltage difference between the anode and cathode electrodes. At any other radius of electron deposit, a fraction F are delivered which varies from one (100%) for a radius equal to the cathode radius down to zero (0%) for a radius equal to the anode radius. This fraction is in fact equal to the fraction of the total cathode to anode potential difference through which the electron charge falls during collection. FIG. 2 shows the variation of pulse heights obtained from the anode electrode when an equal energy interaction occurs at different radial positions in a 5 cm diameter detector having an anode radius of 0.05 cm. FIG. 3 shows the distribution of pulse heights observed on the anode wire when such a cylindrical detector is uniformly irradiated. Because the field is highly concentrated near the anode a strongly peaked distribution is seen, but the peak width is on the order of 5 to 8%, very much poorer than the intrinsic limit for a xenon detection medium of optimal density 0.55 g/cm³ density. Therefore, to determine the deposited energy accurately, the radial position of the deposited energy relative to the anode electrode must also be determined with precision, and the pulse height must be corrected for this radial dependence. Without correction, relatively poor energy resolution is obtained.

So far, no method to accurately determine this radial coordinate has been reported. The only method that has achieved significant improvement of resolution in a cylindrical detector is use of a Fritch grid positioned as a concentric mesh around the anode wire, analogous to the grids used in planar devices. Cylindrical ionization chambers employing a Fritch grid have only achieved energy resolution figures of approximately 2% FWHM, similar to planar grid devices, and no group has been able to approach the intrinsic energy resolution of HPXe. Wiley & Sons, 2000; Tepper G, Loose J, Palmer R. *Development of High-Resolution. Room Temperature. Compressed-Xenon Cylindrical Ionization Chamber Gamma Radiation Detector.* Incomplete grid shielding, the microphonic sensitivity of the grid, the high capacitance, and the extreme dimensional tolerances and fragility of the structure of the grid may explain this.

SUMMARY OF THE INVENTION

This application presents a novel approach to the design and readout of a xenon detection medium based device, which can provide improved spectroscopic performance compared to currently commercially available devices. In order to achieve energy resolution improvement, a structure for and method to accurately measure radial spatial position for interacting events within the HPXe cylindrical detector is described using the a cylindrical ionization detector as shown in FIG. 4. This is accomplished by utilization of light generated both at the gamma interaction site and at the collection point near the anode wire of the cylindrical detector. These light flashes are detected using a VUV sensitive detector such as a photomultiplier tube (PMT), avalanche photodiode, or wire chamber employing tetrakis (dimethylamino)ethylene (TMAE) or CsI photocathode. Light transmission is facilitated by incorporating a vacuum ultraviolet (VUV) light transparent window, such as $MgF_2$ or $CaF_2$, into at least one end of the cylindrical ionization detector. With the known electron drift velocity in HPXe, the time between these two photopulses is sufficient to accurately determine the radial coordinate. Consequently, correction by electronic means for the electrostatic pulse dispersion using the expression graphed in FIG. 2 can be achieved in order to approach the true intrinsic energy resolution limit for HPXe. In summary, the cylindrical HPXe detectors of this invention safely and economically contains HPXe at the optimal spectroscopic density of 0.55 g/cm³ and provides a method of improving the spectroscopic performance of the cylindrical detector geometry.

DETAILED DESCRIPTION OF THE DRAWINGS

Figure 1:
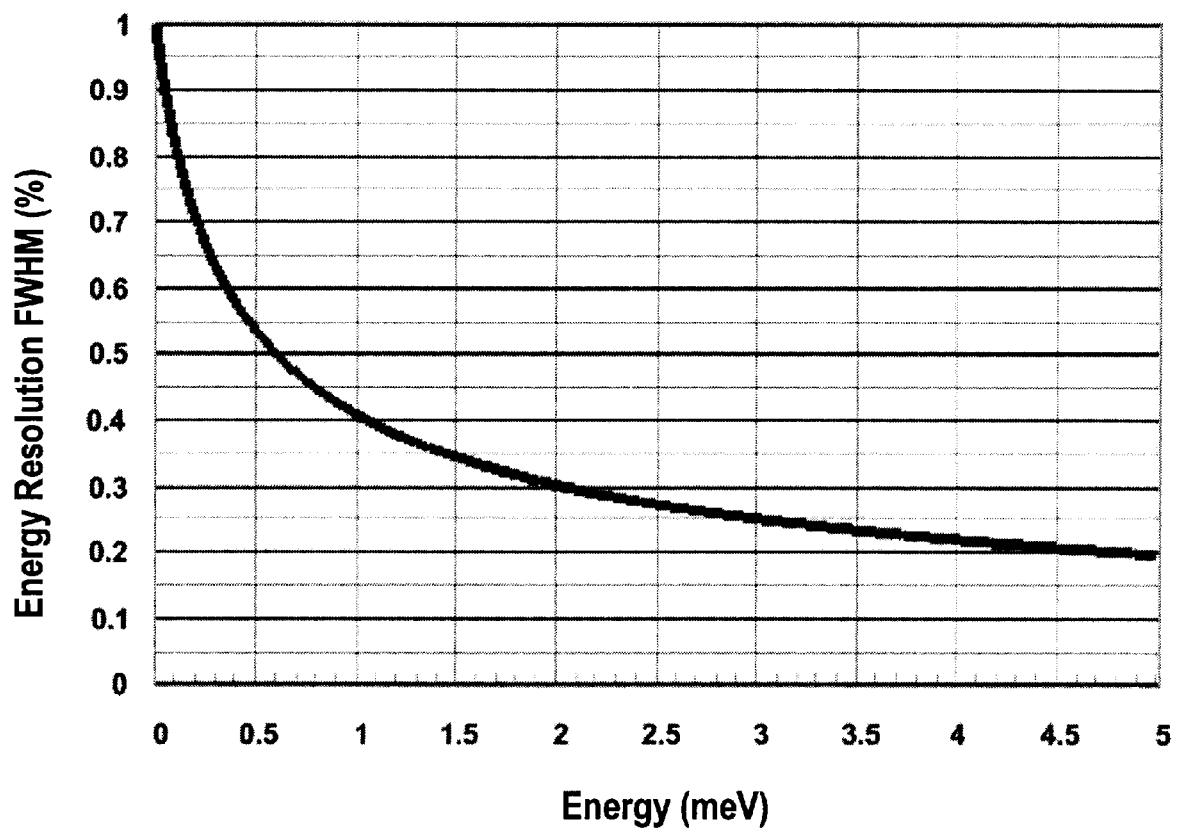
FIG. 1 shows the expected energy dependence of xenon resolution at 0.55 g/cm³.
Figure 2:
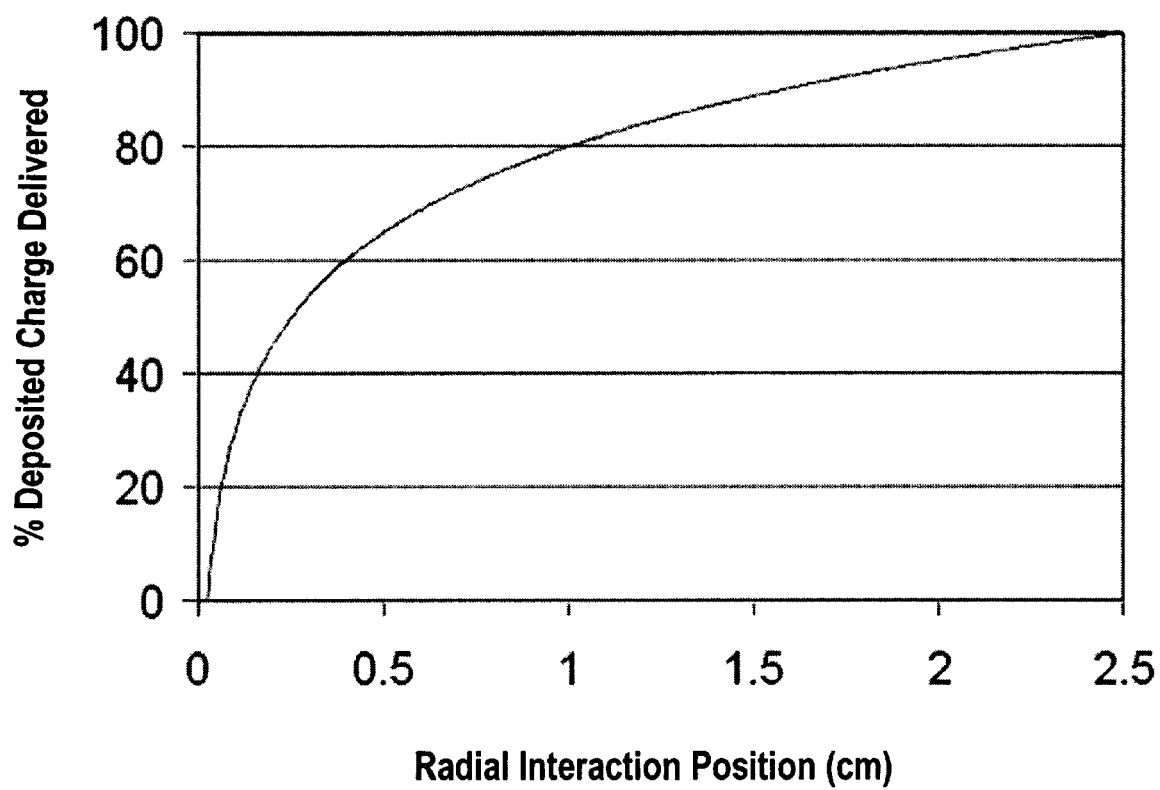
FIG. 2 shows the variation of pulse heights obtained from the anode electrode when an equal energy interaction occurs at different radial positions in a 5 cm diameter detector having an anode radius of 0.05 cm.
Figure 3:
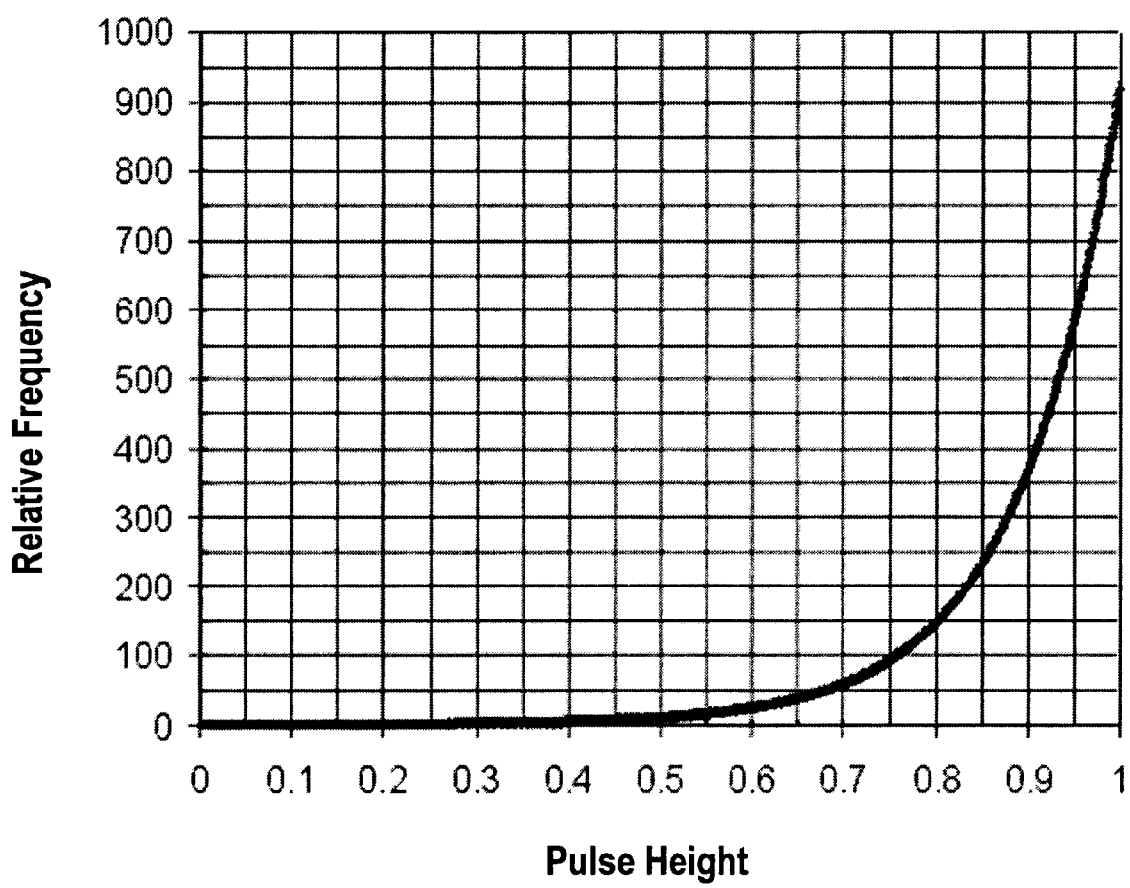
FIG. 3 shows the distribution of pulse heights observed on the anode wire when such a cylindrical detector is uniformly irradiated.
Figure 4:
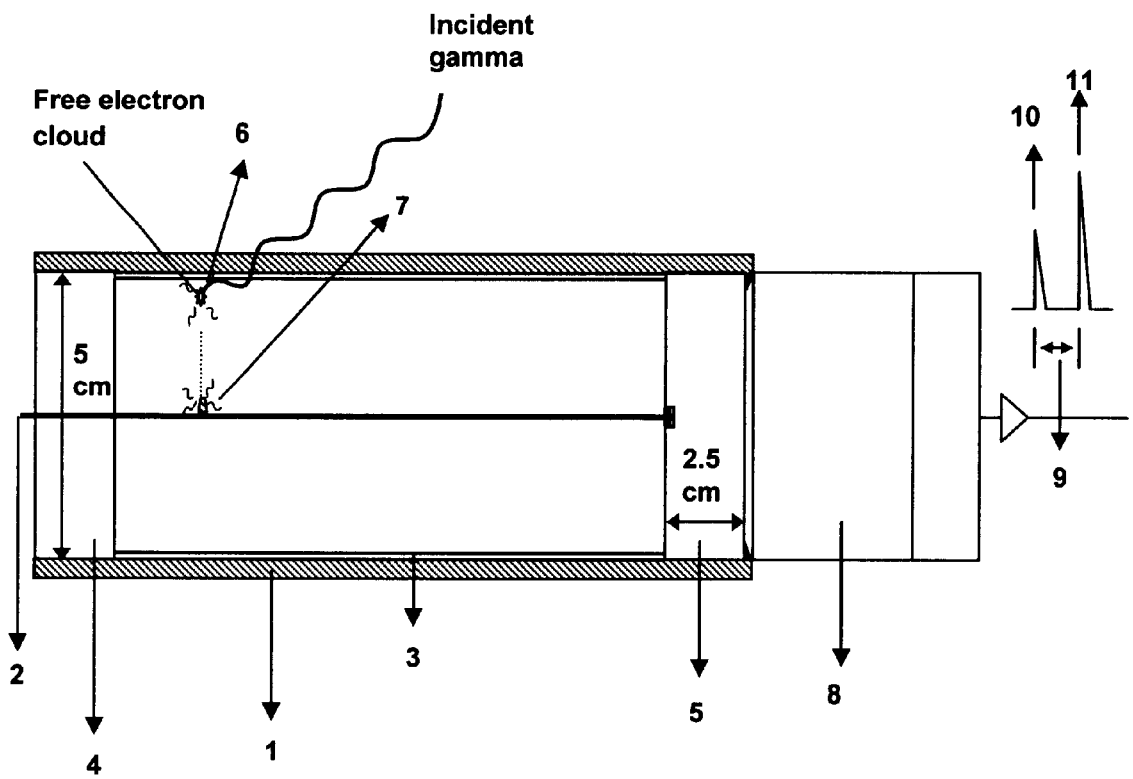

FIG. 4 is a schematic plan for a cylindrical ionization detector for detecting radiation, comprising a cylindrical central anode electrode, a surrounding pressure containing cylindrical conducting electrode, a pressure sealing end plug at one end of the cylinder capable of containing xenon gas at a density in the range 0.1–0.6 g/cm³ and having an electrical connection means for conducting signal charge from the central electrode to a charge sensitive amplifier, and a VUV transparent pressure containing end window at one end of the cylindrical ionization detector facilitating transmission of xenon fluorescence photons at 173 nm from an interior position of the cylindrical ionization detector to a VUV photon detector.

DETAILED DESCRIPTION OF THE INVENTION

In its most basic embodiment this invention, as basically illustrated in FIG. 4, comprises a cylindrical ionization detector for detecting radiation; comprising (1) a cylindrical central anode electrode 2, (2) a surrounding cylindrical shell constructed in such a manner that at least its inner surface is conductive and robust pressure containing capabilities are provided 1, (3) a pressure sealing end plug 4 at one end of the cylinder capable of containing xenon gas at a density in the range 0.1–0.6 g/cm3 and having an electrical connections means (not illustrated) for conducting signal charge from the central anode electrode 2 to a charge sensitive amplifier (not illustrated), (4) a VUV transparent pressure containing end window 5 at one end of the cylinder, composed for example of $MgF_2$ or $CaF_2$, facilitating transmission of xenon fluorescence photons at 173 nm from interior positions 6 and 7 of the cylindrical ionization detector to a VUV photon detector 8, such as a photomultiplier tube. With a cylindrical ionization detector of such structure it is possible to use the signal from the photon detector to achieve, on an event by event basis, the absolute time interval 9 between the primary scintillation pulse 10 and the stimulated scintillation pulse 11 corresponding to the collection time interval of the electron cloud produced by ionizing radiation interactions such as gamma rays from its point of origin 6 to the anode electrode 2. It thus becomes possible to use this collection time, together with known electron drift velocity, to estimate the radial coordinate 12 of the ionizing interaction so as to facilitate correction of the pulse amplitude seen on the anode for the variation of potential difference versus radius.

The cathode and anode electrode diameters should be selected so as to optimally facilitate collection of charge from the inner perimeter of the cathode of the cylindrical ionization detector and to minimize recombination effects by employing a field of 4,000–6,000 volts/cm near the surface of the cathode electrode while, at the same time, providing optimal stimulated scintillation light production over a gap from the surface of the anode electrode out to about one anode diameter from the anode surface, such condition being achieved by choosing the cathode to anode radii to have a ratio between about 20 and 80, and optimally about 32, for operation at a xenon density of about 0.55 g/cm³. Further, use of an appropriate dispersive or reflective coating 13, such as vapor deposited Al on the inner cathode wall, will facilitate light transmission to the VUV transparent end window. It is also possible to use a second VUV light transmitting window (like 5) in place of the pressure sealing end plug 4, by extending the anode electrode 2 completely through the second VUV window in a gas tight manner, and a second photo detector to detect transmitted light and use of comparative signal amplitudes from the two photo detectors to provide the longitudinal position coordinate of interacting events. Use of a second VUV light transmitting window in place of the pressure sealing end plug and a second photo detector to detect transmitted light allows use of presence of a signal from either photodetector to obtain the primary interaction time allowing for a doubling of the cylindrical ionization detector length producing efficient detection of primary scintillation light.

EXAMPLE

The use of scintillation light, in a manner as described, has been achieved by constructing a detector with a VUV transmitting end window constructed of $MgF_2$. An anode wire of 20 gm diameter was affixed in the center of this $MgF_2$ window crystal by epoxying it into a shallow hole drilled in the inner surface of the window. The wire was then tensioned in the aluminum tube of 4 mm inside diameter and 5 cm length. The tube, serving as the cylindrical conducting cathode electrode, was then filled to a pressure of 48 atmospheres with high-purity xenon and coupled to a quartz window PMT (Electron Tubes #9235) through an inert argon gas space. Tube excitation was produced by a Tc-99m (0.3 $\mu$Ci) point source placed near the detector surface. With such a source placed 1 cm from the light transmitting $MgF_2$ crystal, the phototube output signal was taken at a series of HPXe anode voltages of 0 volts, 800 volts, and 1500 volts. Operation with no collection field (0 volts) demonstrated efficient detection of primary scintillation, which was observed at a rate expected for 140 keV interactions in xenon. At a collection voltage of 800 volts both primary and stimulated emission pulses were observed. At this anode voltage drift field was less than optimal and the wide dispersion in anode arrival times was seen ranging out to 3.6 $\mu$sec. In a more optimal drift field of 1500 volts, a substantial narrowing of arrival times was seen with maximum time delay of about 1 $\mu$sec. Further increase of anode voltage produced little if any effect on drift time up to voltages of 3500 volts. Single sweep examples of individual events showed two distinct and well-resolved light signals corresponding to primary and stimulated emission scintillation. The primary scintillation light level produced by 140 keV radiation in this example device was marginal. With no special preparation to optimize reflectivity of the cylindrical conducting electrode interior, photon detection efficiency falls off toward the far end of the 5 cm tube. This problem may be resolved by treatment of the inner tube surface to carry a reflective coating 13 to improve reflectivity and/or to apply a wavelength shifting coating together with such reflective coating and by increasing the tube diameter. The observed fall off of light intensity with distance traversed down the tube and the inevitable presence of this attenuation even with improved reflectivity suggests use of a window at each end of the tube facilitating comparison of light amplitudes to achieve longitudinal position determination. Since the observed stimulated light pulse in the pilot study is very large, measurement of this ratio can be accomplished with excellent precision.

This example demonstrates the feasibility of determination of the radial interaction coordinates utilizing primary and stimulated scintillation light and use of this radial position to provide a basis for more accurate correction for geometric signal dispersion, and furthermore, use of the relative stimulated light amplitude detected at respective ends of the tube to achieve longitudinal position measurement. While the present invention has been described and illustrated by reference to particular embodiment thereof, it will be appreciated by those of ordinary skill in the art that the invention lends itself to variations not necessarily illustrated herein. The ancillary electronic means, i.e. computer codes and/or programs, that will be part of the operation of a cylindrical ionization detector as here described and the essential structure and method of operation of which is claimed, may vary in obvious ways that do not depart from the spirit of this invention once revealed to one of ordinary skill in this art. For these reason, then, reference should be made solely to the appended claims for the purposes of determining the true scope of the present invention.

The foregoing disclosure and description of the invention are illustrative and explanatory thereof, and various changes in the details of the illustrated apparatus and construction and method of operation may be made without departing from the spirit of the invention.

What is claimed is:

1. A cylindrical ionization detector for detecting radiation, comprising; (1) a cylindrical central anode electrode, (2) a surrounding pressure containing cylindrical conducting electrode, (3) a pressure sealing end plug at one end of the cylinder capable of containing xenon gas at a density in the range 0.1–0.6 $g/cm^3$ and having an electrical connection means for conducting signal charge from the central electrode to a charge sensitive amplifier, (4) a VUV transparent pressure containing end window at one end of the cylindrical ionization detector facilitating transmission of xenon fluorescence photons at 173 nm from an interior position of the cylindrical ionization detector to a VUV photon detector.

2. In a cylindrical ionization detector for detecting radiation, comprising; (1) a cylindrical central anode electrode, (2) a surrounding pressure containing cylindrical conducting electrode, (3) an pressure sealing end plug at one end of the cylindrical ionization detector capable of containing xenon gas at a density in the range 0.1–0.6 $g/cm^3$ and having an electrical connection means for conducting signal charge from the central electrode to a charge sensitive amplifier, (4) a VUV transparent pressure containing end window at one end of the cylindrical ionization detector facilitating transmission of xenon fluorescence photons at 173 nm from an interior position of the cylindrical ionization detector to a VUV photon detector, use of a signal from the VUV photon detector to achieve on an event by event basis an absolute time interval of collection of an electron cloud produced by ionizing radiation interactions from its point of origin to the anode electrode.

3. In a cylindrical ionization detector for detecting radiation, comprising; (1) a cylindrical central anode electrode, (2) a surrounding pressure containing cylindrical conducting electrode, (3) an pressure sealing end plug at one end of the cylindrical ionization detector capable of containing xenon gas at a density in the range 0.1–0.6 $g/cm^3$ and having an electrical connection means for conducting signal charge from the central electrode to a charge sensitive amplifier, (4) a VUV transparent pressure containing end window at one end of the cylindrical ionization detector facilitating transmission of xenon fluorescence photons at 173 nm from an interior position of the tube to a VUV photon detector, use of a signal from the photon detector to achieve on an event by event basis an absolute time interval of collection of an electron cloud produced by ionizing radiation interactions from its point of origin to the anode electrode, and use of this collection time together with known electron drift velocity to estimate the radial coordinate of the ionizing interaction to facilitate by electronic means correction of the pulse amplitude seen on the anode for the variation of potential difference versus radius.

4. In the detector of claim 1, selection of the cathode and anode electrode diameters to optimally facilitate collection of charge from an interior perimeter position of the cylindrical ionization detector and to minimize recombination effects by employing a field of 4,000–6,000 volts/cm near the surface of the cathode electrode while providing optimal stimulated scintillation light production over a gap from a surface of the anode electrode out to about one anode diameter from the anode surface, such condition being achieved by choosing the cathode to anode radii to have a ratio between about 20 and 80 for operation at a xenon density of about 0.55 g/cm$^3$.

5. In the detector of claim 1, use of an dispersive or reflective coating optionally with an additional wavelength shifting coating deposited on the inner cathode wall, to facilitate light transmission to the VUV transparent end window.

6. In the detector of claim 1, use of a VUV light transmitting window as the pressure sealing end plug and a second photo detector to detect transmitted light and use of comparative signal amplitudes from the two photo detectors to provide a longitudinal position coordinate of an interacting event.

7. In the detector of claim 1, use of a VUV light transmitting window as the pressure sealing end plug and a second photo detector to detect transmitted light and use of presence of a signal from either photodetector to obtain the primary interaction time facilitating increasing of the cylindrical ionization detector length producing efficient detection of primary scintillation light.

8. The detector of claim 1 wherein the VUV transparent pressure containing end window at one end of the cylinder is composed of $MgF_2$ or $CaF_2$.

9. The detector of claim 1 wherein the VUV photon detector is a photomultiplier tube.

10. The detector of claim 1 wherein the VUV photon detector is a gaseous detector employing a CSI (Cesium Iodide) photocathode.

11. A detector of claim 3 wherein the electron cloud produced by ionizing radiation interactions is produced by gamma rays.

12. The detector of claim 4, wherein the cathode to anode radii are chosen to have a ratio of about 32.

13. A method for measuring radial spatial position for an interacting event within a cylindrical ionization detector comprising (1) a cylindrical central anode electrode, (2) a surrounding pressure containing cylindrical conducting electrode, (3) a pressure sealing end plug at one end of the cylinder capable of containing xenon gas at a density in the range 0.1–0.6 g/cm$^3$ and having an electrical connection means for conducting signal charge from the central electrode to a charge sensitive amplifier, and (4) a VUV transparent pressure containing end window at one end of the cylindrical ionization detector facilitating transmission of xenon fluorescence photons at 173 nm from an interior position of the cylindrical ionization detector to a VUV photon detector; comprising the steps of:

detecting xenon fluorescence photons at 173 nm generated as a primary scintillation pulse at an ionizing radiation interaction site and as generated as a stimulated scintillation pulse at a collection point near the anode wire of the cylindrical detector, determining an absolute time interval of collection of an electron cloud produced by an ionizing radiation interaction from its point of origin within the cylindrical conducting electrode to the anode electrode; and using the absolute time interval and electron drift velocity to determine the radial coordinate of the ionizing radiation interaction.

14. The method of claim 13 wherein the cathode and anode electrode diameters are selected to optimally facilitate collection of charge from an interior perimeter position of the cylindrical ionization detector and to minimize recombination effects by employing a field of 4,000–6,000 volts/cm near the surface of the cathode electrode while providing optimal stimulated scintillation light production over a gap from a surface of the anode electrode out to about one anode diameter from the anode surface, such condition being achieved by choosing the cathode to anode radii to have a ratio between about 20 and 80 for operation at a xenon density of about 0.55 g/cm$^3$.

15. The method of claim 14 further comprising the step of correcting of the pulse amplitude seen on the anode for the variation of potential difference versus radius.

16. The method of claim 15 wherein the cathode to anode radii are selected to have a ratio of about 32.

* * * * *